(12) United States Patent
De Marchi

(10) Patent No.: US 6,276,839 B1
(45) Date of Patent: Aug. 21, 2001

(54) PLUG ARRANGEMENT FOR AN OPTICAL INSERT RACK PLUG CONNECTION

(75) Inventor: Silverio De Marchi, Ascona (CH)

(73) Assignee: Diamond SA, Losone (CH)

( * ) Notice: Subject to any disclaimer, the term of this patent is extended or adjusted under 35 U.S.C. 154(b) by 0 days.

(21) Appl. No.: 09/174,118

(22) Filed: Oct. 19, 1998

(30) Foreign Application Priority Data

Nov. 13, 1997 (EP) .................................................. 97810865

(51) Int. Cl.⁷ ..................................................... G02B 6/36
(52) U.S. Cl. ................................ 385/53; 385/62; 385/70; 385/72; 385/76; 385/78; 385/81
(58) Field of Search .................................. 385/70, 59, 60, 385/78, 53, 72, 79, 81, 62

(56) References Cited

U.S. PATENT DOCUMENTS

| | | | |
|---|---|---|---|
| 4,793,683 | * 12/1988 | Cannon, Jr. et al. | 385/60 |
| 4,798,440 | * 1/1989 | Hoffer et al. | 385/89 |
| 4,872,736 | * 10/1989 | Myers et al. | 385/60 |
| 5,528,711 | * 6/1996 | Iwano et al. | 385/56 |
| 5,542,015 | * 7/1996 | Hultermans | 385/60 |
| 5,764,834 | * 6/1998 | Hultermans | 385/60 |

FOREIGN PATENT DOCUMENTS

94/24594    10/1994 (WO) .

* cited by examiner

Primary Examiner—Hemang Sanghavi
Assistant Examiner—Sung Pak
(74) Attorney, Agent, or Firm—Shoemaker and Mattare, Ltd.

(57) ABSTRACT

An insert-rack plug connection can be created between at least one sleeve portion (2) on a relatively fixed-position mother board (3) and at least one plug portion (4) on a relatively mobile daughter board (5). With that, the plug arrangement comprises a plug housing (6) mounted to displace axially on the daughter board and possessing a plug ferrule (7) mounted under preloaded axial spring tension. In addition, engagement means (8) for engagement of the plug housing into an engagement position in the sleeve portion are provided on the plug housing. In the insertion direction (x), the plug housing (6) is supported either directly of indirectly on a spring-action thrust element (9), the spring force of said thrust element maintaining the support until the engagement position has been reached, and subsequently automatically releasing said support on continued thrust movement. In this way, the daughter board (5) can be mechanically decoupled from the plug ferrule (7) or from the mother board (3) after reaching the engaged position in order to compensate mass tolerances. A U-shaped fork (9) preferably serves as a spring-action thrust element, the spring-action fork prongs of said fork being provided with thrust lugs (11) which coordinate with a mechanical thrust stop (14).

17 Claims, 10 Drawing Sheets

Figure 1:
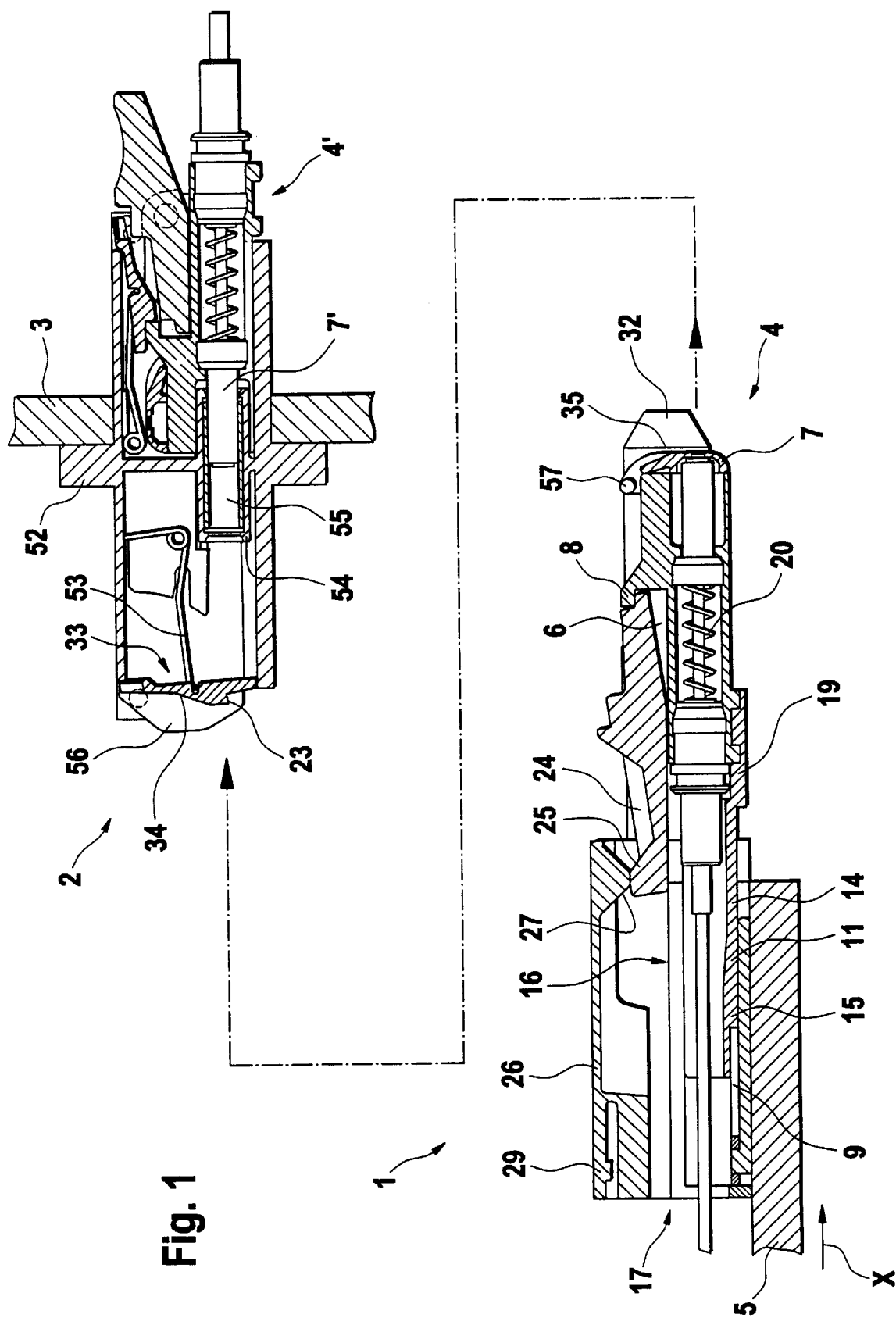

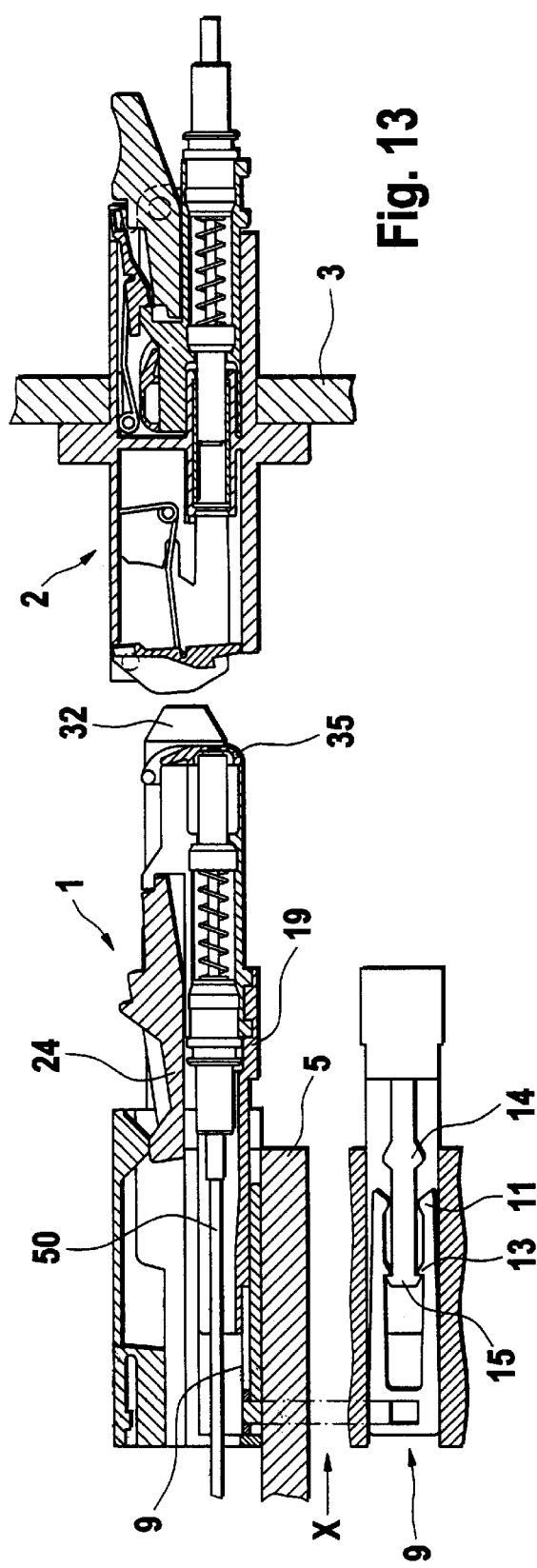
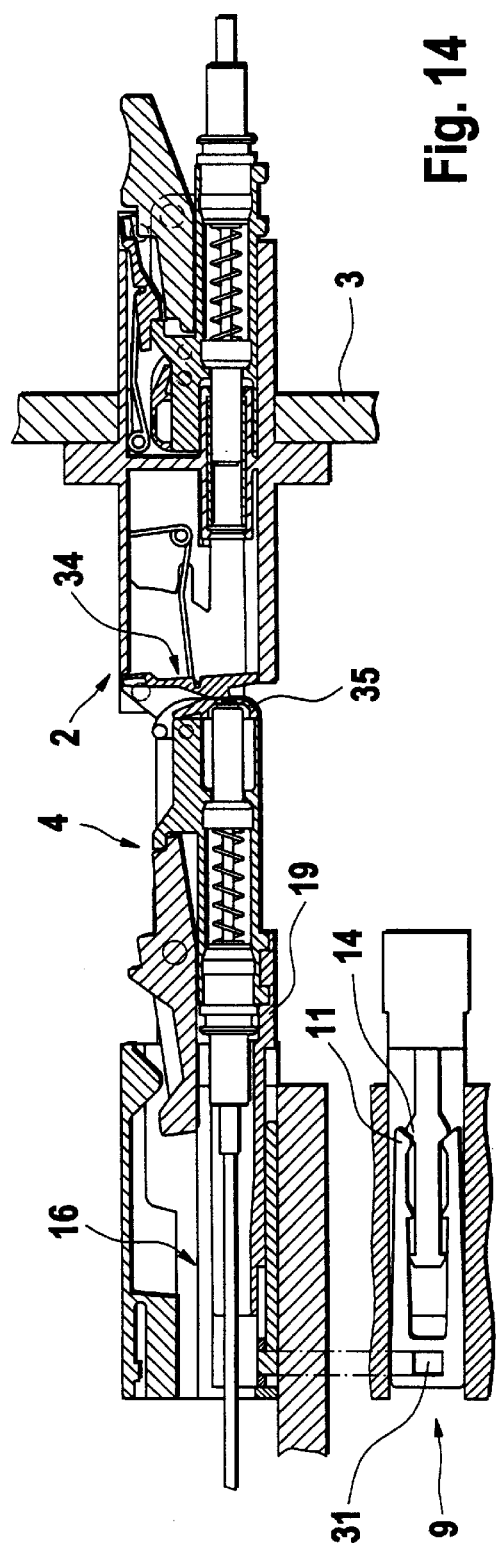

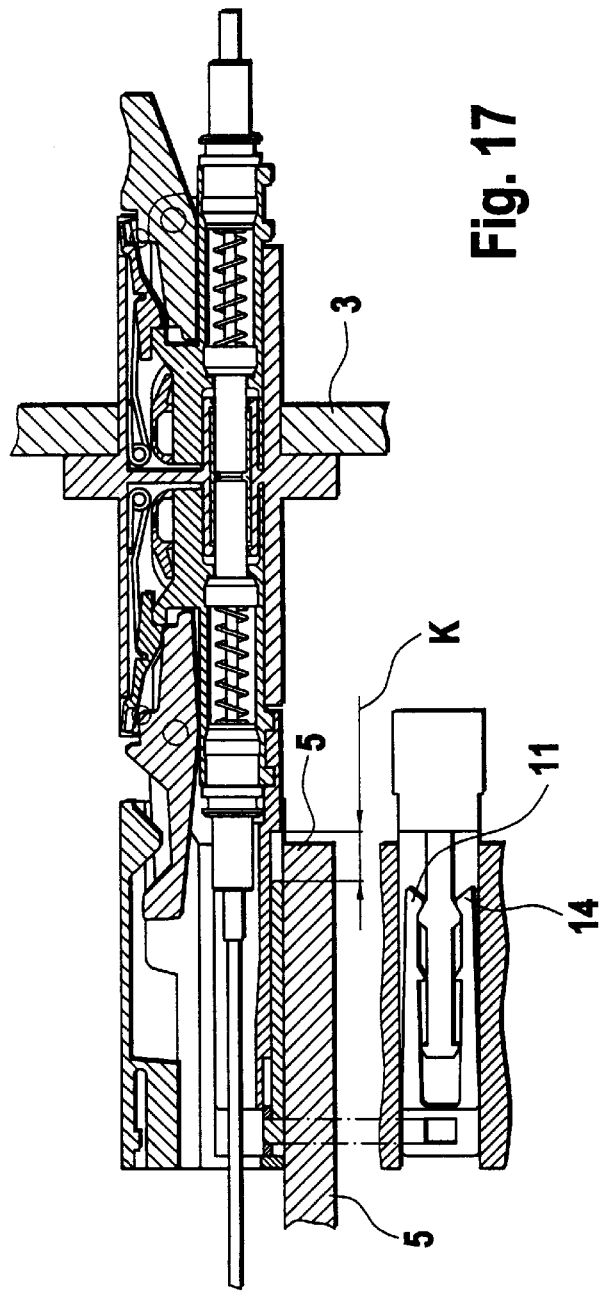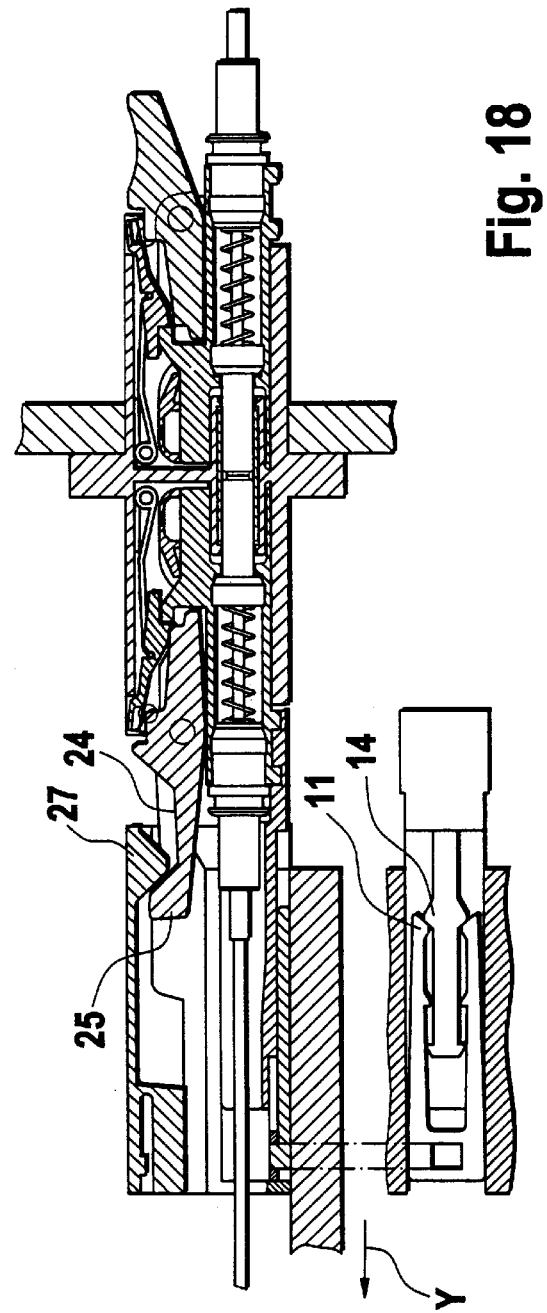

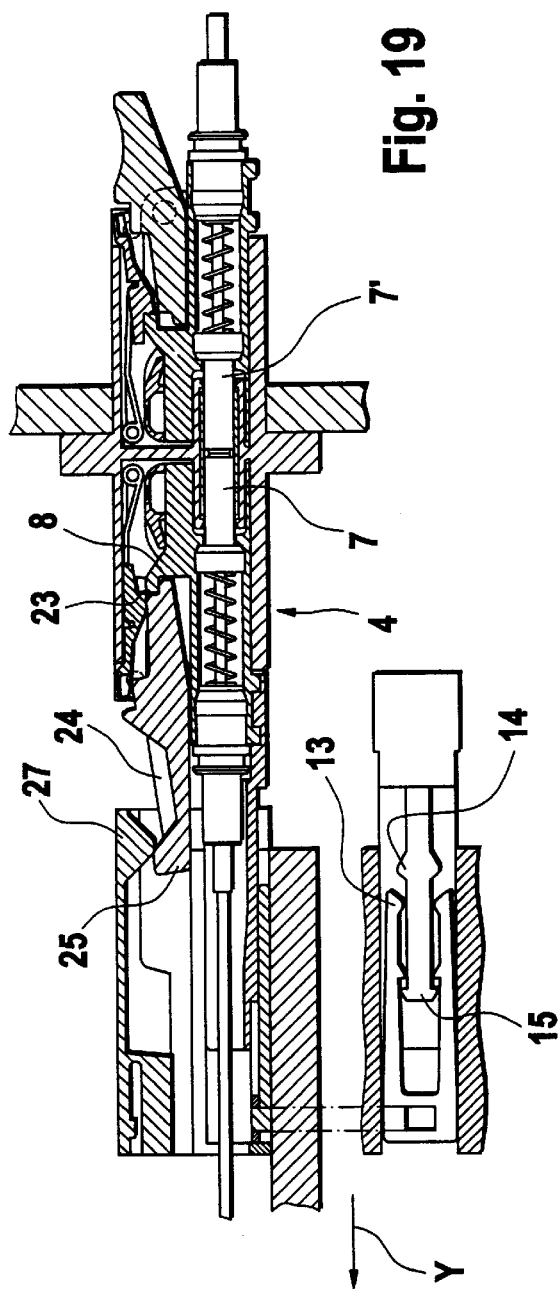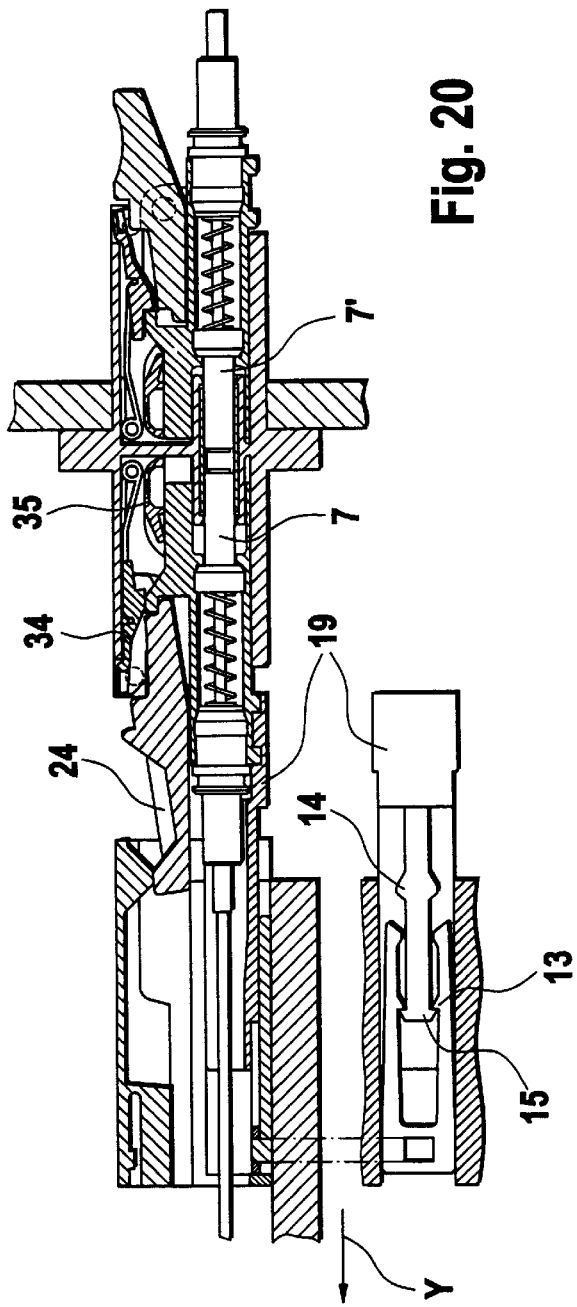

PLUG ARRANGEMENT FOR AN OPTICAL INSERT RACK PLUG CONNECTION

The invention concerns a plug arrangement for an optical insert rack plug connection. These types of plug arrangements serve to fix, for example, a printed circuit board equipped with a plurality of optical plug connectors into the casing of a device in such a way that said plugs are inserted into corresponding sleeves, said sleeves being fastened to a transverse back-panel of a device.

As opposed to electrical insert-rack connectors, in the case of an optical fibre plug connection, an axial press force must be maintained on the plug ferrules at all times, in order to ensure optimal transmission of light with the least possible return losses or suppression. This axial spring force is, in the case of conventional insert-rack plug connections, also transmitted to the daughter board, said daughter board being subjected to constant mechanical strain. In addition, compensation for dimensional tolerances is practically impossible.

An optical insert-rack plug connector has been disclosed in WO 94/24594 for so-called push-pull plugs, wherein the daughter board can be mechanically decoupled from the plug ferrule or mother board after attaining the inserted position. For this purpose, spring-action support fingers on the inside of the plug housing are depressed by means of ribs on the sleeve housing so that, with stationary plug ferrule, the outer plug housing connected to the daughter board can be moved without preloaded spring tension still further towards the sleeve portion. This solution is, however, relatively complicated because standard sleeve portions cannot be employed and also because the actual plug portion must also be subjected to considerable modification.

It is therefore a purpose of the invention to create a plug arrangement of the type mentioned in the introduction, with the aid of which an insert-rack plug connection, with a mechanically decoupled daughter board, can be manufactured without the need for modification to the sleeve portion. In addition, standard internal plug components should be used here, as also employed for convention plug connectors. According to the invention, this purpose is fulfilled with a plug arrangement as described below.

The direct or indirect support of the plug housing on a spring-loaded thrust element has the advantage that all means required for decoupling the daughter board can be accommodated on the plug arrangement itself. The spring force can here be exactly set in such a way that, when inserting the daughter board, said force is greater than the frictional force up to attainment of the inserted position, the support thus being maintained. Only when the thrust force increases during continued thrust motion will the preloaded spring tension on the thrust element be overcome and the support automatically released.

It is of particular advantage if the thrust element is a U-shaped fork, the prongs of which can be splayed and/or pinched together, thrust lugs being arranged on the prongs to coordinate with a mechanical thrust stop. By means of the U-shaped fork, the spring force required for the thrust can be distributed to two fork prongs. In place of the fork, other spring-action thrust elements are conceivable such as, for example, depressable spring-loaded balls or ramps, or also pivoting lever springs or similar.

The fork is advantageously allocated to the daughter board, the thrust lugs being arranged on the inside of the fork prongs pointing in the insert direction. At the same time, further advantages can be attained if, between the fork base and the thrust lug on each fork prong, in each case a lok-king-latch tooth is arranged, said locking-latch tooth coordinating with a mechanical pull stop for withdrawal of the daughter board. The U-shaped fork thus fulfils the function of a push-pull element, the locking-latch teeth limiting the maximum relative movement of the plug portion on the daughter board. Because the fork prongs can be splayed, the mechanical pull stop can easily engage behind the locking-latch teeth.

The fork is held at the fork base in an insert-rack housing, said housing forming at least one guide shaft for the plug portion. Alternatively, however, the actual daughter board could also be formed in such a way that the plug portion is subjected to direct axial guidance on the board. In this type of case, the fork could also be mounted directly on the daughter board.

Further advantages can be achieved if the plug portion is mounted on a carriage to be able to slide axially within the guide shaft and if the mechanical thrust stop is arranged on said carriage. The carriage ensures perfect guidance for the insert-rack housing on the one hand, and on the other hand also enables the employent of conventional plug portions so that no parts serving the guide function are required on the actual plug portion. With that, the plug portion can be connected with the carriage so as to be removable.

The plug housing can possess a section fitting interlockingly in a mounting cradle on the carriage, the carriage being able to possess holding clips to fix said plug portion in the mounting cradle.

The engagement means for fixing of the plug housing in the sleeve portion can be a locking strip arranged on the plug housing, said locking strip coordinating with a spring-action locking latch on the sleeve portion when in the engaged position. At the same time, a release lever can be mounted to pivot on the plug casing, the locking latch being releasable with said release lever, said release lever possessing a guide cam coordinating with the insert-rack housing in such a way that, when the plug portion is completely withdrawn, the release lever is pressed into the release position. Optical plugs which engage on sliding into the sleeve portion and which can be released again by activation of a release lever are already state of the art. By coordination of the release lever with the insert-rack housing, such plugs attain a pure push-pull function, the plug being able to be released from the engaged position solely by means of a pull movement.

The guide shaft on the insert-rack housing can be covered by a removable cover, a control lug being arranged on the side of the cover oriented towards the shaft, said control lug coordinating with the guide cam on the release lever. One advantage of such an arrangement is that it also facilitates assembly. The cover can, with that, slide into lateral guide grooves on the shaft side walls, and can be lockable with a releasable snap-fastener.

The fork, too, can be slid on the floor of the guide shaft into lateral guide grooves on the shaft side walls, or can also be merely laid in the shaft and locked at the fork base on a fixing lug. In this way, the fork can be easily replaced or the same insert-rack housing can be equipped with forks possessing varying spring force.

It is advantageous if the insert-rack housing possesses a plurality of parallel guide shafts arranged adjacently, both shafts at the extremities each being equipped with an insertion-guide arm for centering the plug portions with the corresponding sleeve portions. These insertion-guide arms ensure that the plug portions approach up to the correct relative position on the sleeve portions.

The insert-rack plug connection is preferably equipped with a sleeve portion, the sleeve opening of said sleeve portion being closed with a pivoting flap, said flap being pivoted upwards when sliding in the plug portion. With that, the actual sleeve mounted within the sleeve portion remains protected from contamination. In addition, for example the emission of laser light from an opposing plug inserted in the sleeve portion is avoided.

The plug housing, too, can also be closed off with a pivoting cap at its face, said cap pivoting when the plug portion is inserted. Individual plugs of this type are state of the art.

Finally, the protective flap on the sleeve portion can form a spring-action locking latch, said latch engaging behind a locking tap on the plug housing when in the engaged position. The protective flap thus fulfils a double function, in that it closes off the sleeve portion on the one hand, and on the other hand holds an inserted plug portion in the engaged position.

Figure 2:
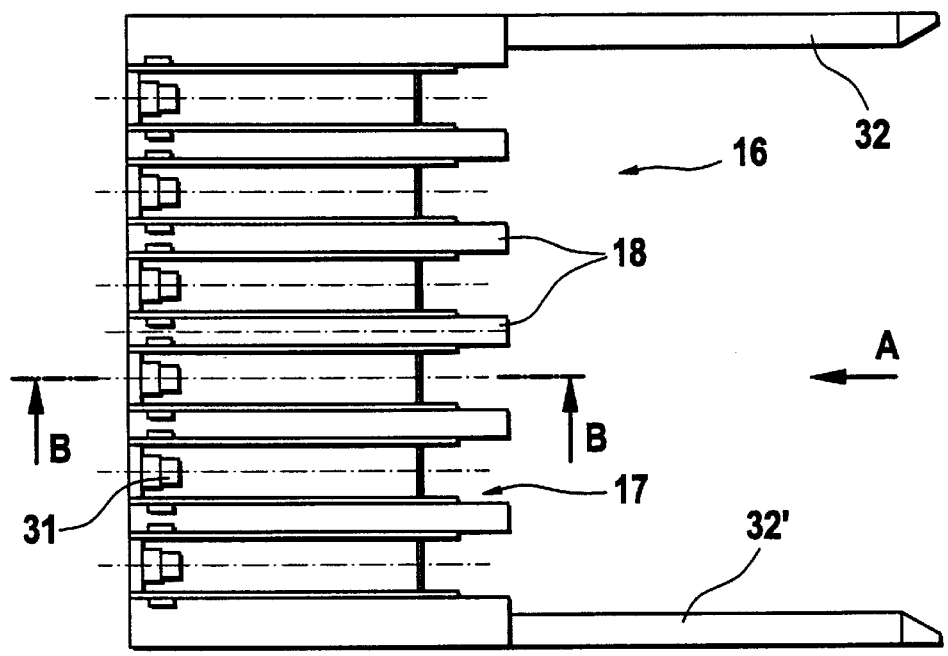
Figure 3:
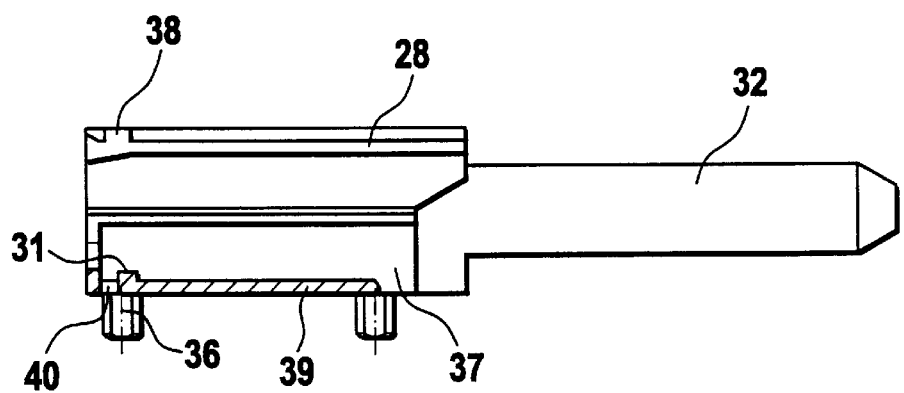
Figure 4:
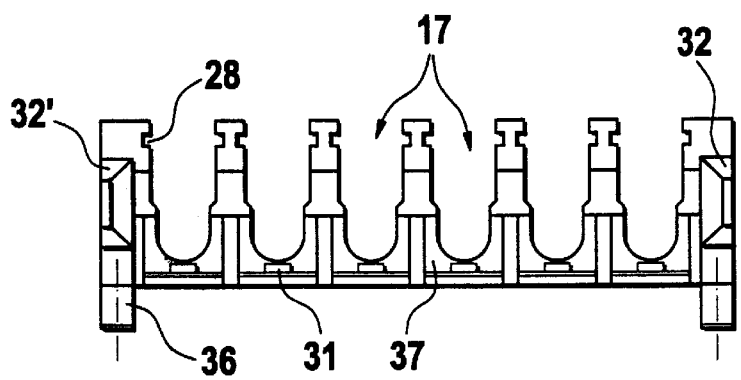
Figure 5:
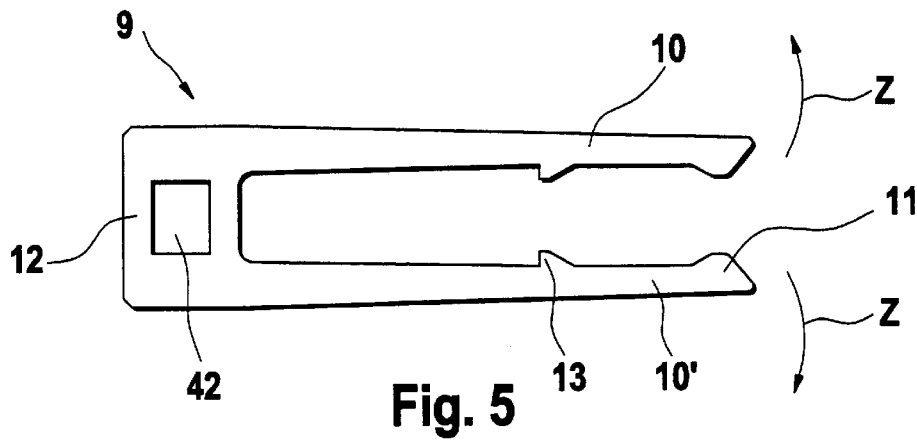
Figure 6:
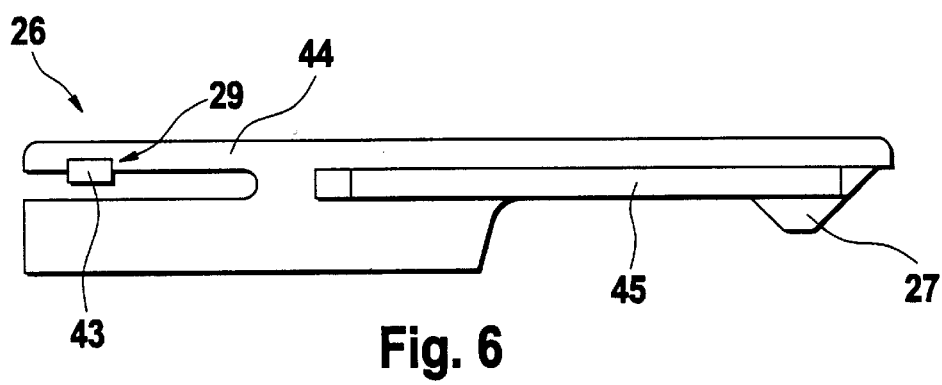
Figure 7:
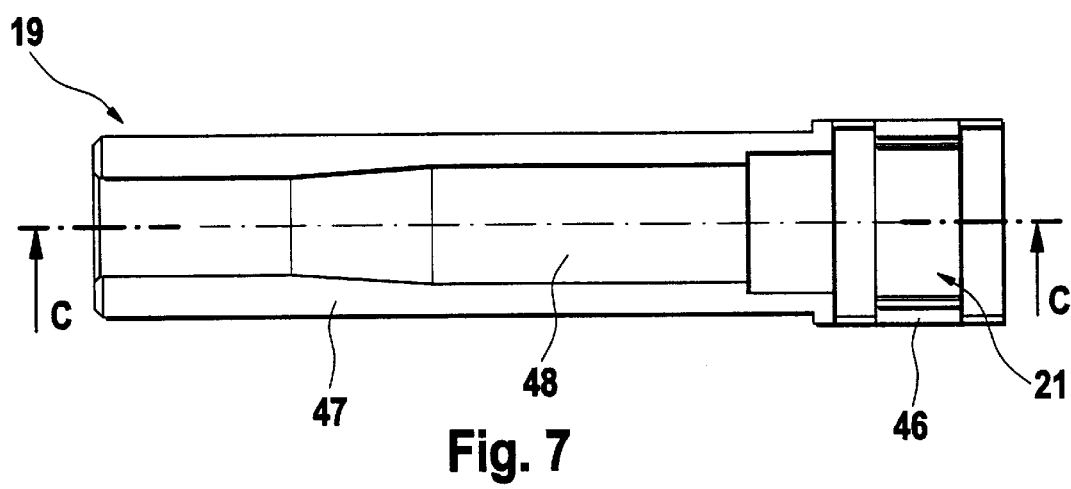
Figure 8:
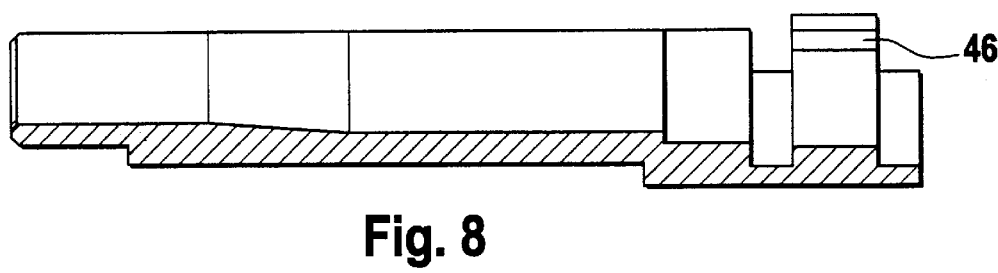
Figure 9:
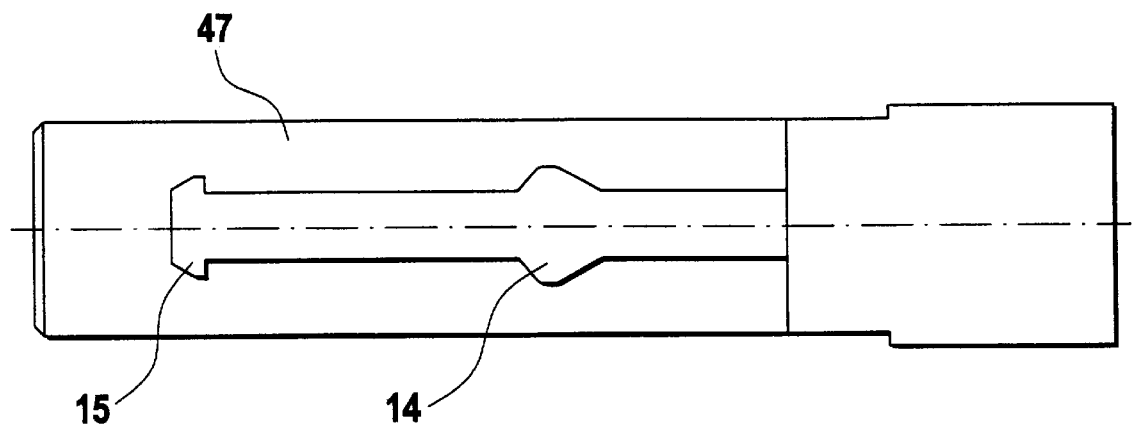
Figure 10:
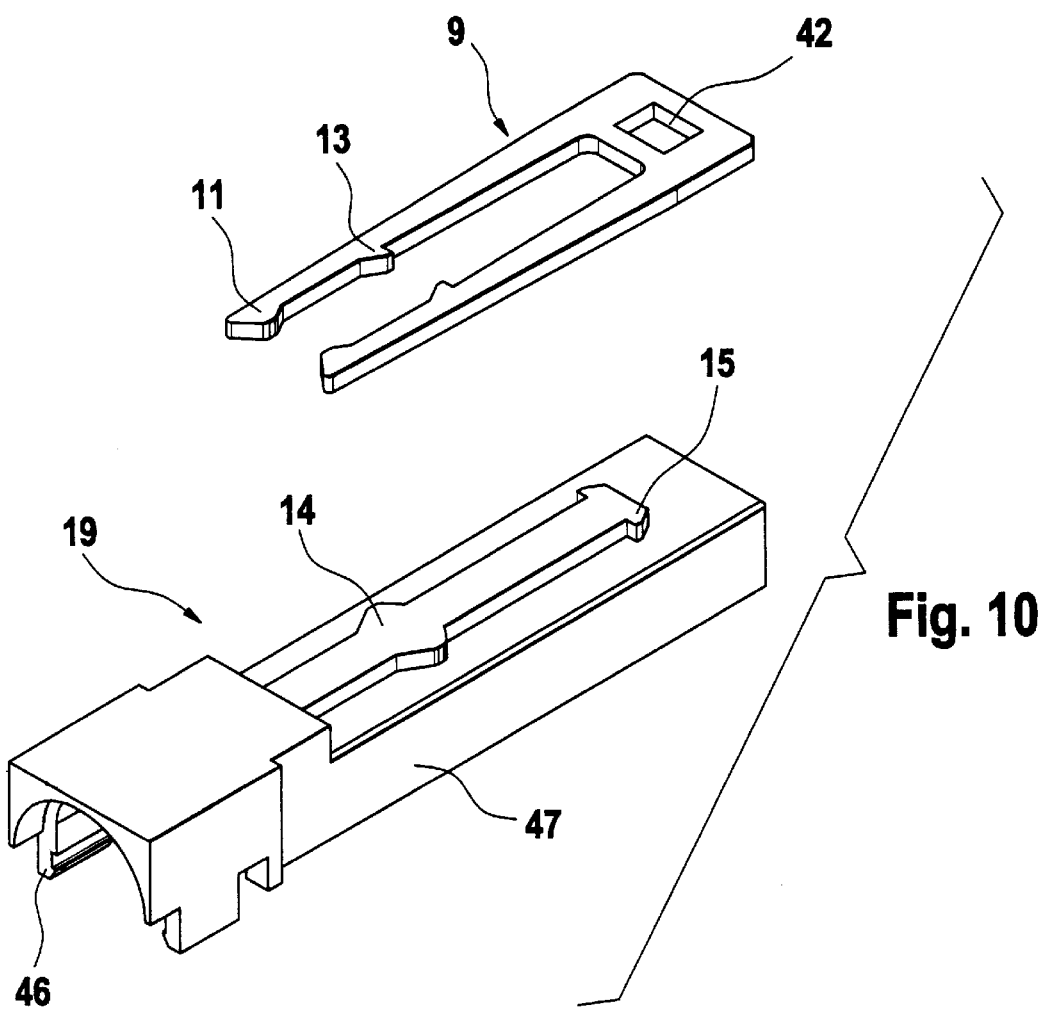
Figure 11:
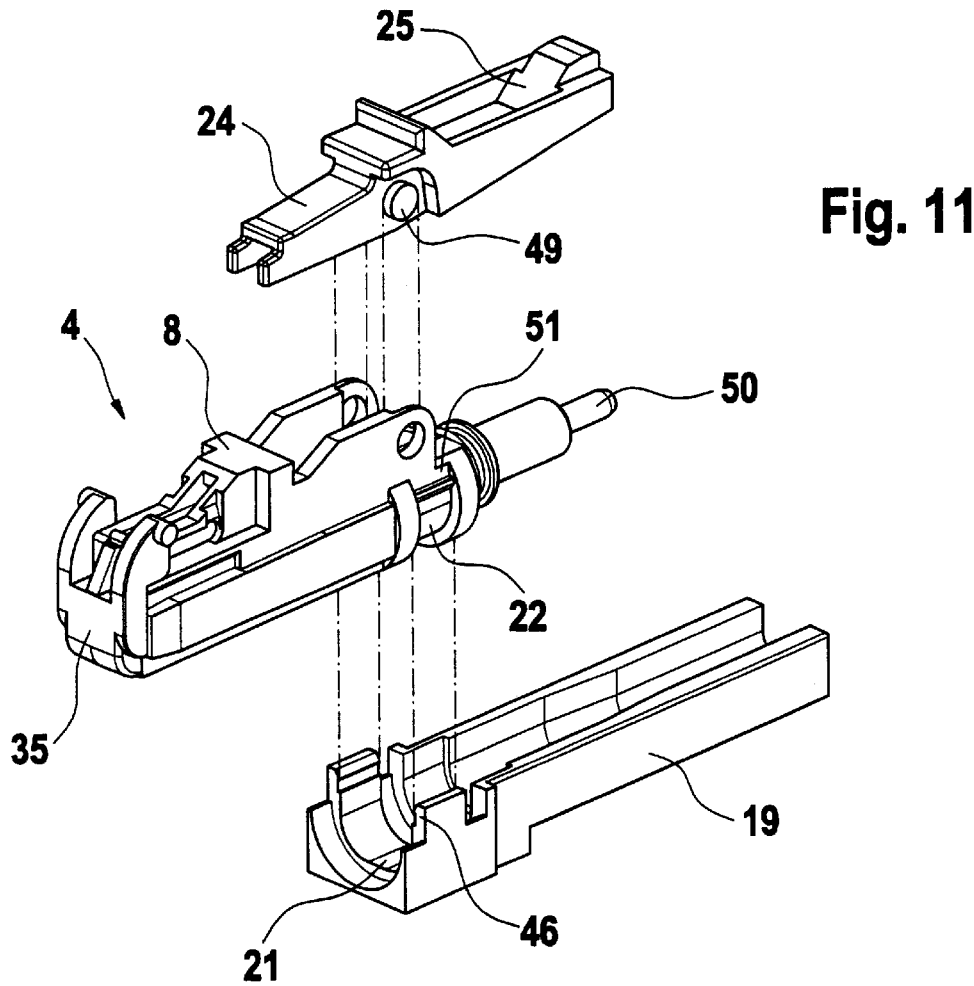
Figure 12:
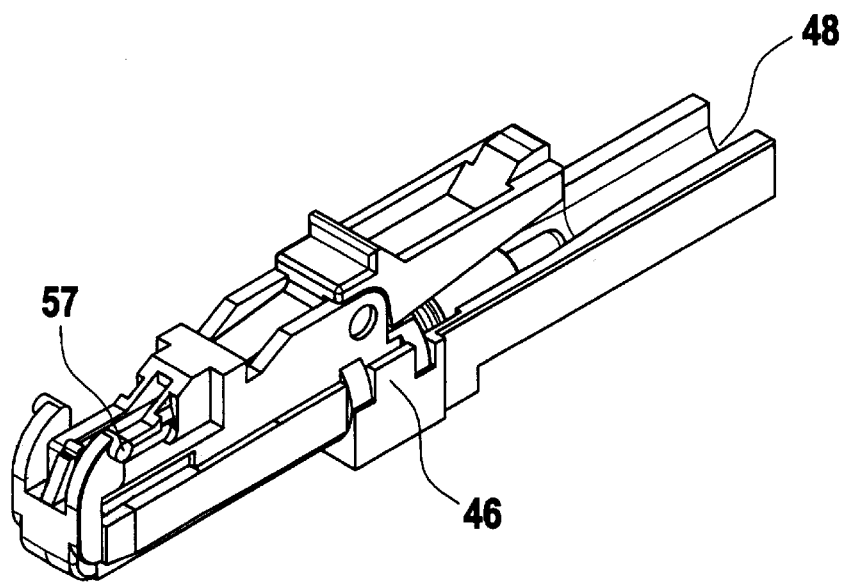
Figure 21:
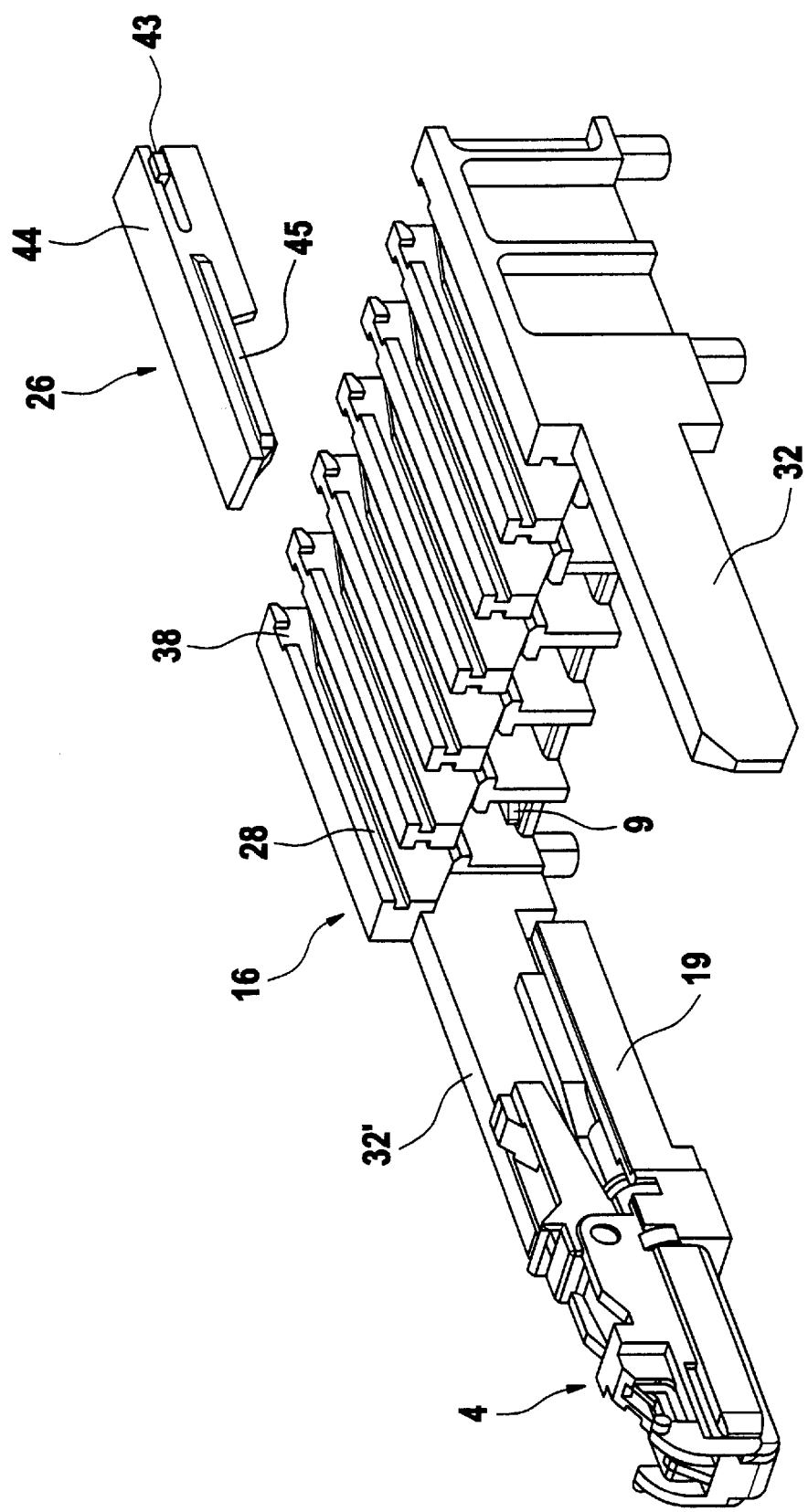

Further features and advantages of the invention arise from the following description of one embodiment, and from the drawings: namely, FIG. 1 a cross section through an insert-rack plug connection according to the invention, FIG. 2 a plan view onto the insert-rack housing with a total of six guide shafts, FIG. 3 a cross section through the plane B—B on the insert-rack housing according to FIG. 2, FIG. 4 a view from the direction of arrow A onto the insert-rack housing according to FIG. 3, FIG. 5 a plan view of a fork, FIG. 6 a side view of a cover, FIG. 7 a plan view of a carriage, FIG. 8 a cross section along the plane C—C on the carriage according to FIG. 7, FIG. 9 a view from beneath of the carriage according to FIG. 7, FIG. 10 a perspective view onto the underside of the carriage according to FIG. 7, with a fork above, FIG. 11 a perspective representation of a plug portion and a carriage prior to assembly, FIG. 12 the plug portion and the carriage according to FIG. 11 in the assembled state, FIGS. 13 to 20 various sequences during creation and release of the insert-rack plug connection, and FIG. 21 a perspective representation onto the insert-rack housing according to FIG. 2 with cover removed.

On the basis of FIG. 1, the principle components of the plug arrangement 1 and the sleeve portions will first of all be explained. Accordingly, the plug arrangement 1 comprises an insert-rack housing 16 mounted firmly on the daughter board 5 and in which a plurality of plug portions 4 are mounted to be able to displace axially. The individual plug portions 4 are fixed to a carriage 19, said carriage being guided in the insert-rack housing. Each carriage is allocated to its own guide shaft 17, the top of said shaft being covered by a cover 26.

The plug portion possesses a plug housing 6, a plug ferrule 7 being mounted in said plug housing to be axially spring-loaded against a pressure spring 20. To protect the plug ferrule, the face of the plug housing is closed off by a protective cap 35, said cap being pivoted up and displaced to the rear only during the insertion sequence. A locking tab 8 is arranged for fixing the plug housing 6 within the sleeve portion 2, the rear of said tab being able to be engaged by a locking latch 23 on the sleeve portion. A release lever 24 is mounted to be able to pivot on the plug housing 6 in order to release the lock, said lever possessing a single arm reaching the immediate vicinity of the locking tab 8. The other lever arm is provided with a guide cam 25 at its free end, said cam coordinating with the control lug 27 on the cover 26 in a way to be described in the following.

A U-shaped fork 9 with spring-action prongs is fastened to the floor of each guide shaft 17. This fork coordinates with a mechanical thrust stop 14 and with a mechanical pull stop 15 on the lower side of the carriage 19 (FIG. 13).

The sleeve portion 2 is formed as a penetrating guide coupling and is fastened to the mother board 3 by means of a flange 52, said mother board for example also being able to be the back-panel of a housing. An optical plug 4, 4' can be inserted into each sleeve portion from both sides, the plug ferrules 7, 7' of said plugs being exactly centred in relation to one another in a precision-machined sleeve 55 and pressed together. The sleeve 55 is held in a sleeve bearing 54. The sleeve opening 33 on the insert-rack-oriented side is closed off with a pivoting protective flap 34, said flap being held in the closed position by means of a spring 53.

The locking latch 23 for locking the plug portion in the engaged position is arranged on the outside of the protective flap. During the insertion sequence, a pair of lateral guide grooves 56 coordinate with lateral control lugs 57 on the protective cap 35 and cause the protective cap to pivot away. The sleeve portion 2 is not specially formed for the plug arrangement according to the invention, but can also be used for conventional individual plugs. More precise details about the function of the sleeve portion can be obtained from European application 97810513.8.

Details about the insert-rack housing 16 and the fixation of the forks 9 into the individual guide shafts can be seen in FIGS. 2 to 6. As shown in FIG. 2, the individual guide shafts 17 are limited by side walls 18. Each outermost side wall merges integrally with an insertion-guide arm 32, 32'. Attachment lugs 36 are arranged in the floor 39 of the insert-rack housing 16, said lugs serving attachment to the daughter board.

Each individual guide shaft 17 can be closed off with a cover 26 (FIG. 6). For this purpose, lateral guide grooves 28 are provided on the shaft sidewalls. Lateral guide strips 45 on the cover 26 engage into the guide grooves 28. The fixation of each cover is achieved by means of a snap fastener 29. Said snap fastener comprises a spring-action lever 44 possessing a laterally protruding tab 43 at its end section. Said tab snaps into lateral recesses 38 on the shaft sidewall 18. To release the lock, the spring-action lever 44 must be depressed slightly so that said tab disengages again. A control lug 27 is arranged on the underside of each cover.

The configuration of a fork 9 can be seen in FIGS. 5 and 10. The fork is formed integrally from a flat material section of spring steel or plastic and possesses the two fork prongs 10, 10', said prongs connected together at the fork base 12. A rectangular opening 42 is arranged in the fork base 12, at which the fork can be mounted into the insert-rack housing. A thrust lug 11 is arranged on the inside at the outermost end of each fork prong. Slightly further towards the fork base 12, a locking-latch tooth 13 is mounted on each prong, also on the inside. The thrust lugs 11 are inclined on both sides, while the locking-latch teeth 13 possess an inclination only in the insertion direction. Both the fork prongs 10, 10' can be splayed against their spring force in the direction of the arrow z.

Fixation of the forks in the individual guide shafts is achieved by laying directly on the floor of each shaft. A fixing lug 31 is arranged at the rear end of each shaft, said lug engaging in the opening 42 of a fork. A penetrating opening 40 is provided in the floor 39 immediately behind the fixing lug, so that the fork base 12 can be lifted off the fixing lug 31 through the opening 40 using a suitable tool.

Details of the carriage 19 can be seen in FIGS. 7 to 10. Each carriage 19 is formed as a half-shell and equipped with lateral carriage skids 47. Each carriage is guided on said carriage skids in lateral skid guides 37 on the insert-rack housing 16. The carriage possesses a mounting cradle 21 for accommodating the plug portion and a cable fitting 48 in which the optical fibre cable 50 (FIG. 11) can be accommodated. Holding clips 46 are arranged in the area of the mounting cradle 21, said clips engaging in the tabs 51 on the plug housing. On the underside, each carriage is equipped with a mechanical thrust stop 14 and a mechanical pull stop 15, the congiguration of said stops being visible in FIGS. 9 and 10. The maximum wall thickness of these mechanical stops is dimensioned in such a way that they can engage between the fork prongs 10, 10'. The mechanical thrust stop 14 has an external configuration permitting overrunning of both the thrust lugs 11 in both directions, after overriding a specific spring force. The maximum width of a mechanical thrust stop 14 is, with that, obviously greater than the distance between two opposing thrust lugs 11. Conversely, the configuration of the mechanical pull stop 15 is formed in such a way that overrunning of the locking-latch teeth 13 is only possible in one direction during initial fitting. The maximum width of the mechanical pull stop 15 is likewise greater than the distance between two neighbouring locking latch-teeth 13, although without splaying the fork prongs 10, 10', withdrawal after initial fitting is no longer possible.

Further details of the fixation of the plug portion 4 on a carriage 19 can be seen in FIGS. 11 and 12. Each plug housing is equipped with a mounting section 22 which fits interlockingly into the mounting cradle 21 of a carriage. The lateral holding clips 46 create a U-shaped surround of the plug housing and engage in a strip 51, thus connecting the plug housing with the carriage in such a way as to be releasable. The plug portion 4 can, with that, also be employed as a fully conventional plug.

FIGS. 11 and 12 also show the lateral bearing trunnions 49 for the pivoting mount of the release lever 24 as well as the lateral control lugs 57 for pivoting up and retraction of the protective cap 35.

The sequences during insertion and withdrawal of the plug arrangement according to the invention are more closely described in the following, with the aid of FIGS. 13 to 20. The figures show in each case cross sections through the plug arrangement and through the sleeve portion, with the relative position of the fork being shown with each plug arrangement as a view of the fork and the carriage from below, for reasons of clarity.

According to FIG. 13, the plug arrangement 1 is moved in insertion direction x towards the mother board 3, a number of sleeve portions 2 corresponding to the number of plug portions being arranged on said mother board. The insertion-guide arms 32 have not yet reached their guide openings on the mother board. The carriages 19 are fully extended and the release lever 24 is still depressed in the release position.

With the sequence shown in FIG. 14, the protective cap 35 is up against the protective flap 34 on the sleeve portion 2. By means of the ensuing resistance, the carriage 19 is inserted into the insert-rack housing 16 until the mechanical thrust stop 14 makes contact on the thrust lug 11 of the fork 9. Each subsequent thrust movement in the direction of the arrow x now ensues against the spring force of the fork 9. The spring force is however sufficient to overcome friction when the plug portion 4 enters the sleeve portion 2.

Figure 15:
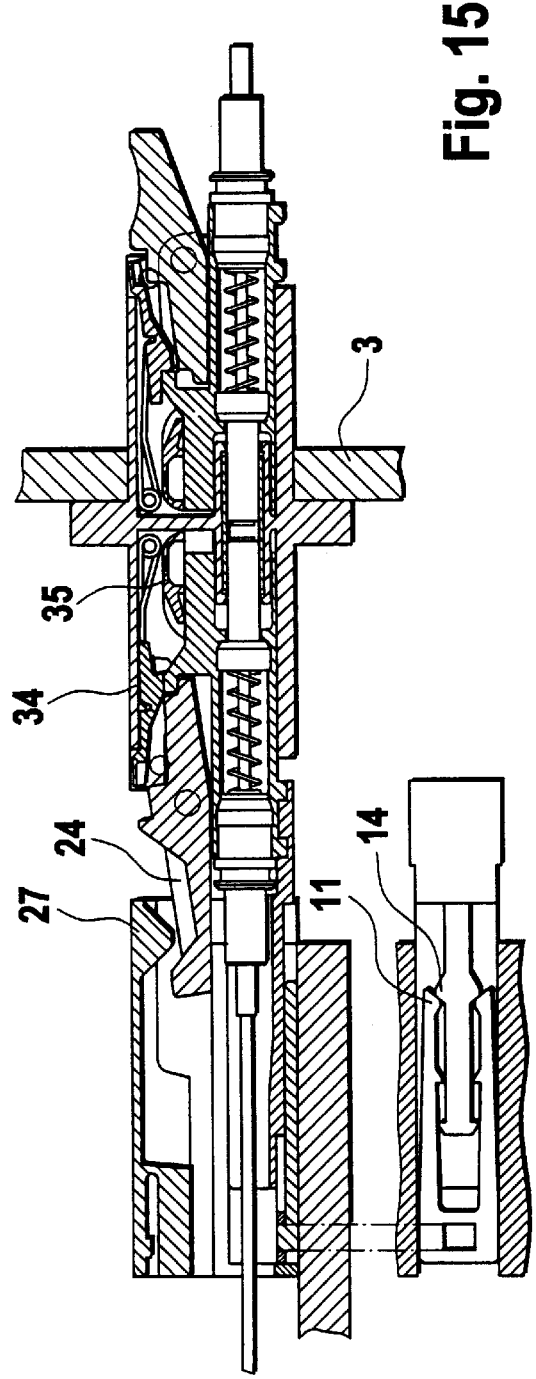

The next sequence, shown in FIG. 15, shows the position of the plug portion 4 shortly before reaching the engagement position. The protective flap 34 has been pivoted totally inwards and the protective cap 35 has been pivoted up through 9° and retracted to the rear. The release lever 24 has been freed and is no longer fixed in the release position by means of the control lug 27. The thrust lugs 11 remain in contact with the mechanical thrust stop 14.

Figure 16:
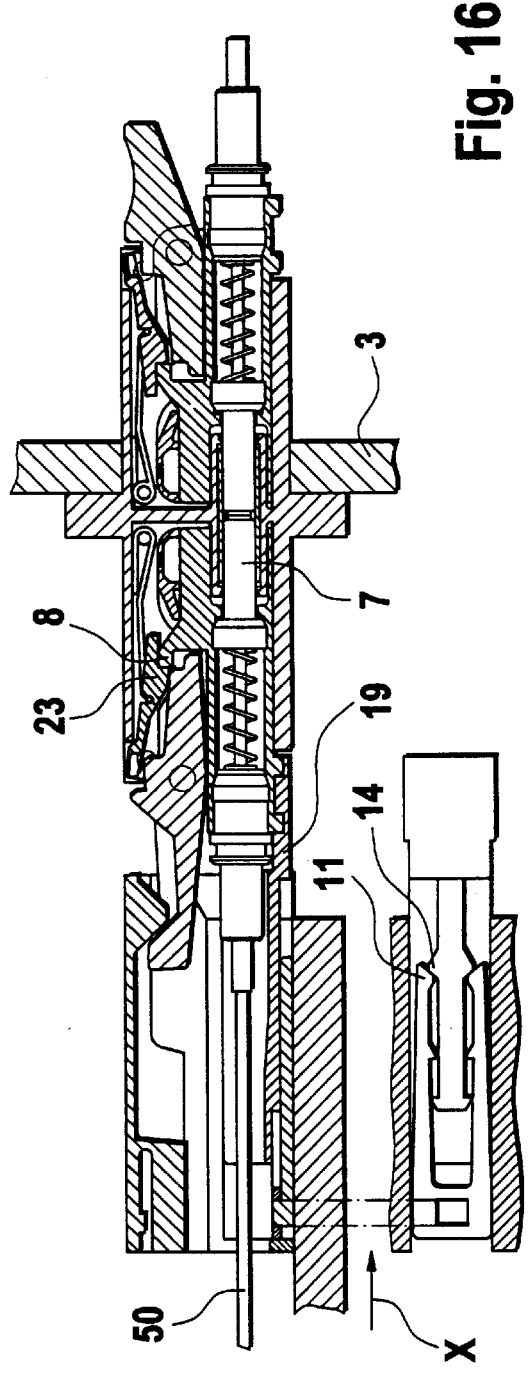

FIG. 16 shows the reaching of the engagement position. The locking latch 23 has now engaged behind the locking tab 8 so that the plug ferrule 7 is held against its axial preloaded spring tension in the sleeve 55 and pressed at its face against plug ferrule 7'. The plug can no longer be released by pulling on the cable 50. Now, too, the thrust lugs 11 of the fork 9 still make contact with the mechanical thrust stop 14. Because the carriage cannot be moved further towards the mother board 3, each further thrust movement in the direction of the arrow x will lead to splaying of the fork prongs.

In the position according to FIG. 17, the thrust lugs 11 have overrun the mechanical thrust stop 14 by means of the splaying action. The daughter board 5 is now, from the force point of view, decoupled from the mother board 3 and can be moved a specific distance further towards the mother board. The maximum possible axial compensation K enables compensation of mass tolerances and fitting of the daughter board within the housing free of strain.

When withdrawing the plug arrangement 1 in the direction of the arrow y, according to FIG. 18 first of all the mechanical thrust stop 14 is once again overrun in the opposite direction by the two thrust lugs 11. During this withdrawal movement, however, the plug portion remains in the locked position, inserted and unchanged, within the sleeve portion until the control lug 27 makes contact with the guide cam 25 of the release lever 24.

According to FIG. 19, further withdrawal movement causes first of all a depression of the release lever 24, the lok-king latch being raised from behind the locking tab 8. Only at this point can the plug portion 4 be withdrawn from the sleeve portion 2.

When the release lever 24 has reached its final release position, the locking-latch teeth 13 will also make contact with the mechanical pull stop 15. The carriage 19 has now reached its maximum extended position and the pulling force is transmitted directly to the carriage via the mechanical pull stop 15. If withdrawal of the plug portion from the sleeve portion is initiated now, the protective flap 34 will close automatically, and the protective cap 35 will also be pressed into its closed position by a means not shown in detail here.

FIG. 21 shows once again a perspective representation of an insert-rack housing 16 wherein all covers 26 have been removed. In the rearmost guide shaft, the end of the prong of a fork 9 is just visible. The carriage 19 with the plug portion 4 is inserted there, the fork 9 being held securely at the base of the guide shaft. Subsequently, the guide shaft is closed with a cover 26. Naturally, it is not absolutely necessary that each guide shaft of an insert-rack housing is occupied by carriage with a plug portion. Apart from that, depending on the specific application, an insert-rack housing can possess a greater or lesser number of guide shafts.

Inasmuch as the invention is subject to modifications and variations, the foregoing description and accompanying drawings should not be regarded as limiting the invention, which is defined by the following claims and various combinations thereof:

What is claimed is:

1. A plug arrangement for an optical insert-rack plug connection between at least one sleeve portion on a relatively fixed mother board and at least one plug portion of a relatively movable daughter board, said arrangement comprising a plug housing held on said daughter board, a plug ferrule mounted in the plug housing under pre-loaded axial spring tension, means for engaging the plug housing in the sleeve portion in an engagement position, wherein for compensation of mass tolerances the daughter board can be mechanically decoupled from the plug ferrule of from the mother board after reaching the engagement position, and a spring-action thrust element supporting the plug housing, the spring force of said thrust element maintaining the support until attaining the engagement position and subsequently, with continued thrust movement, automatically releasing said support, and the thrust element is a U-shaped fork having prongs which are splayable and/or pinchable together, and further comprising thrust lugs arranged on said prongs, said thrust lugs coordinating with a mechanical thrust stop.

2. A plug arrangement for an optical insert-rack plug connection between at least one sleeve portion on a relatively fixed mother board and at least one plug portion of a relatively movable daughter board, said arrangement comprising a plug housing held on said daughter board, a plug ferrule mounted in the plug housing under pre-loaded axial spring tension, means for engaging the plug housing in the sleeve portion in an engagement position, wherein for compensation of mass tolerances the daughter board can be mechanically decoupled from the plug ferrule of from the mother board after reaching the engagement position, and a spring-action thrust element supporting the plug housing on the daughter board, the spring force of said thrust element maintaining the support until attaining the engagement position in such a way that the spring force in the direction of the insert movement is large enough to resist the pushing force during insertion and subsequently, with continued thrust movement and a rising pushing force, automatically releasing said support, and the thrust element is a U-shaped fork having prongs which are splayable and/or pinchable together, and further comprising thrust lugs arranged on said prongs, said thrust lugs coordinating with a mechanical thrust stop.

3. A plug arrangement for an optical insert-rack plug connection between at least one sleeve portion on a relatively fixed mother board and at least one plug portion of a relatively movable daughter board, said arrangement comprising a plug housing held on said daughter board, a plug ferrule mounted in the plug housing under pre-loaded axial spring tension, and means for engaging the plug housing in the sleeve portion in an engagement position, wherein for compensation of mass tolerances the daughter board can be mechanically decoupled from the plug ferrule of from the mother board after reaching the engagement position, wherein the plug housing is supported on a spring-action thrust element, the spring force of said thrust element maintaining the support until attaining the engagement position and subsequently, with continued thrust movement, automatically releasing said support, and the thrust element is a U-shaped fork having prongs which are splayable and/or pinchable together, and further comprising thrust lugs arranged on said prongs, said thrust lugs coordinating with a mechanical thrust stop.

4. A plug arrangement according to claim 3, wherein said prongs are oriented in an insertion direction and each of said thrust lugs is disposed on said prongs.

5. A plug arrangement according to claim 4, wherein the fork has a base and further comprising a locking-latch tooth arranged between said base and each of said lugs, said locking-latch tooth cooperating with a mechanical pull stop for withdrawal of the daughter board.

6. A plug arrangement according to claim 5, further comprising an insert-rack housing holding the base of said fork, said insert-rack housing having at least one guide shaft for the plug portion.

7. A plug arrangement according to claim 6, further comprising a carriage slidably supporting the plug portion in the guide shaft, and further comprising a mechanical thrust stop on said carriage.

8. A plug arrangement according to claim 7, wherein the plug portion is releasably connected to the carriage.

9. A plug arrangement according to claim 8, wherein the carriage has a mounting cradle and the a portion of said plug housing has an interlocking fit in said mounting cradle, said carriage further comprising a plurality of holding clips for retaining said plug housing in said mounting cradle.

10. A plug arrangement according to claim 9, wherein the engagement means is a locking tab arranged on the plug housing, said locking tab releasably engaging a spring-action locking latch on the sleeve portion, and further comprising a release lever mounted on said plug housing for pivoting movement between a release position and an engagement position, said lever having a guide cam cooperating with the insert-rack housing in such a way that, when the plug portion is completely withdrawn, the release lever is forced into the release position.

11. A plug arrangement according to claim 10, further comprising a cover releasably covering said guide shaft, and a control lug supported on the side of said cover oriented towards said shaft to cooperate with the guide cam on the release lever.

12. A plug arrangement according to claim 11, wherein the shaft has side walls having lateral guide grooves slidably supporting said cover, and a releasable snap fastener for securing said cover.

13. A plug arrangement according to claim 12, wherein the fork is affixed to a floor of the guide shaft and is adapted to be locked to a fixing lug.

14. A plug arrangement according to claim 13, wherein the insert-rack housing has a plurality of parallel, adjacent guide shafts having sidewalls, outermost shaft sidewalls having an insertion-guide arm for centering the plug portions to the corresponding sleeve portions.

15. A plug arrangement according to claim 3, further comprising a sleeve portion having an opening and a pivoting protective flap for closing off said opening, said flap pivoting toward an open position upon insertion of the plug portion.

16. A plug arrangement according to claim 15, further comprising a pivoting protective cap for covering a face of the plug housing, said cap pivoting open upon insertion of the plug portion into the sleeve portion.

17. A plug arrangement according to claim 15, wherein the protective flap forms a spring-action locking latch, said locking latch being adapted to engage behind a locking tab on the plug housing.

* * * * *